United States Patent [19]

Kornus et al.

[11] Patent Number: 4,529,977

[45] Date of Patent: Jul. 16, 1985

[54] ELECTRICAL POSITION SENSOR FOR A MOVABLE ELEMENT

[75] Inventors: Dieter Kornus, Schorndorf; Frank Ruppert, Weinstadt, both of Fed. Rep. of Germany

[73] Assignee: Daimler-Benz Aktiengesellschaft, Stuttgart, Fed. Rep. of Germany

[21] Appl. No.: 500,847

[22] Filed: Jun. 3, 1983

[30] Foreign Application Priority Data

Jun. 9, 1982 [DE] Fed. Rep. of Germany ....... 3221784
Oct. 15, 1982 [DE] Fed. Rep. of Germany ....... 3238235

[51] Int. Cl.³ .............................................. G08B 21/00
[52] U.S. Cl. ................................................ 340/686
[58] Field of Search .............................. 340/686, 687;
200/153 LB, 179; 33/1 PT

[56] References Cited

U.S. PATENT DOCUMENTS 2,595,402  5/1952  Morris .................................. 340/686
3,247,340  4/1966  Kitzmann ........................ 200/61.46

OTHER PUBLICATIONS

Siemens-Zeitschrift, vol. 47, 1973, pp. 603–608.

Primary Examiner—Anthony V. Ciarlante
Attorney, Agent, or Firm—Barnes & Thornburg

[57] ABSTRACT

A desired position is indicated by a pair of electrically conductive stationary regions spaced and electrically insulated from each other along the path of a pair of electrically conductive moving contact regions being in contact with the moving contact regions. The moving contacts are opposing surfaces in a recess or on a protuberance. A pair of indicators electrically connected one to each of the stationary contacts are both activated only when both pairs of contacts are touching each other.

17 Claims, 3 Drawing Figures

ELECTRICAL POSITION SENSOR FOR A MOVABLE ELEMENT

BACKGROUND AND SUMMARY OF THE INVENTION

The invention relates generally to an arrangement for indicating the position of a movable element at a desired location and, more specifically, to an improved electrical arrangement for indicating the desired location.

Such arrangements may be used in particular for indicating a defined position on rotating shafts such as crankshafts, camshafts or similar parts of internal combustion engines.

In the European Pat. No. 0,006,160, the signal generator consists of a support on the stationary casing, which surrounds the moving part, and a dial gauge installed within it with a spring supported contact rod which, on reaching the deepest point in the notch made in the shaft, signals the defined position sought by transmission to the indicator hand of the dial gauge.

Disadvantageous in such an arrangement is the awkward manual determination of the extreme value on the dial gauge which, when mechanically traversing the notch with the contact rod, is only attained at the deepest point in the notch.

Due to the location and installation conditions, the readability of the dial gauge is, on the one hand, often problematical—for example in the case of poor accessibility and lack of light at the reading location—and, on the other hand, the additional space requirement due to the installation height of the dial gauge itself can make its installation difficult or impossible under certain circumstances. It should also be noted that the rotation of the moving part must take place while the dial gauge is being read, in order to find the desired center position and this combination further limits the application or makes it more difficult.

Furthermore, arrangements for the exact setting of the position of two parts relative to one another are mainly used in TDC (top dead center) signal generators as part of diagnosis equipment for motor vehicles. In known arrangements of this type (Siemens-Zeitschrift, Volume 47, 1973, pages 603 to 608), the signal generator (sensor) is installed in the casing, facing a mark on the flywheel of the engine at a defined distance. With every revolution, this mark produces, without contact, a pulse in the signal generator by electro-magnetic means as it passes. These signals can, for example, be evaluated for checking the ignition timing.

Disadvantages of this arrangement are that the signals are from a dynamic measurement, and cannot be produced in the stationary condition, in which an accurate fixing of position should also be possible.

The purpose of the invention is that great accuracy in the desired fixing of the position of previously marked oscillating or rotating machine parts be attainable statically, i.e., in a quasi-rest condition, by means of a device and, on the other hand, that a coincidence indication be also possible remote from the location of the signal generator.

The advantages obtainable using the present invention consist, in particular, in the fact that a device is available at favorable cost with a relatively small outlay. This device permits the determination or fixing of a position with great accuracy on oscillating or rotating machine parts for a wide variety of adjustment procedures. It guarantees a resolution which is unusually high for mechanical devices by the simultaneous point or line contact between two different contact bodies and the object to be inspected. This advantage applies particularly to work on parts of small diameter. A substantial advantage of the invention is, however, also provided by the fact that the signal generator is separately connected as a small component to the machine casing and is only connected by an electrical cable with the otherwise freely movable signalling device with optical and-/or acoustic indication. There is therefore no extra space requirement needed for the signalling device and, furthermore, no light is necessary at the indication location. The lighting-up of signal lamps or the sounding of acoustic signals is easier to perceive than a reading from a dial gauge, particularly when it is associated with the simultaneous rotation of the moving part in the area of the position to be found and with poor accessibility to the signal generator.

In the case of reciprocating engines, the arrangement can be advantageously used after the markings have been applied for the static positioning of crankshafts, camshafts, injection pump shafts and distributor shafts.

These and other objects are attained by using a pair of electrically conductive stationary contact regions spaced along the path of a pair of electrically conductive moving contact regions which form a mark at the desired position on the movable element. The stationary contact regions are biased along an axis transverse to the path of and into contact with the moving contact regions. A pair of indicators are connected one to each of the stationary contact regions and to a power source. When the moving contacts are positioned below the stationary contacts at the desired position, both indicators are activated. With the moving contacts electrically connected to the power source, the indicators are electrically in parallel and with the moving contacts electrically isolated from the power source, the indicators are in series. A two-way switch is provided to select the parallel or series connection. The mark may be a recess in or a protuberance on the surface of the movable element. For a recess, the stationary contact regions form a convex shape having a greater angle relative to the transverse axis than the opposed moving contact regions in the recess. For a protuberance, the stationary contact regions form a concave shape having a greater maximum distance of separation than the moving contact regions.

An illustrative example of the invention is shown in the drawing and is described in more detail below.

BRIEF DESCRIPTION OF THE DRAWINGS

FIG. 1, 1a shows a cross-section through the arrangement with a depressed marking

DETAILED DESCRIPTION OF THE DRAWINGS

Figure 1:
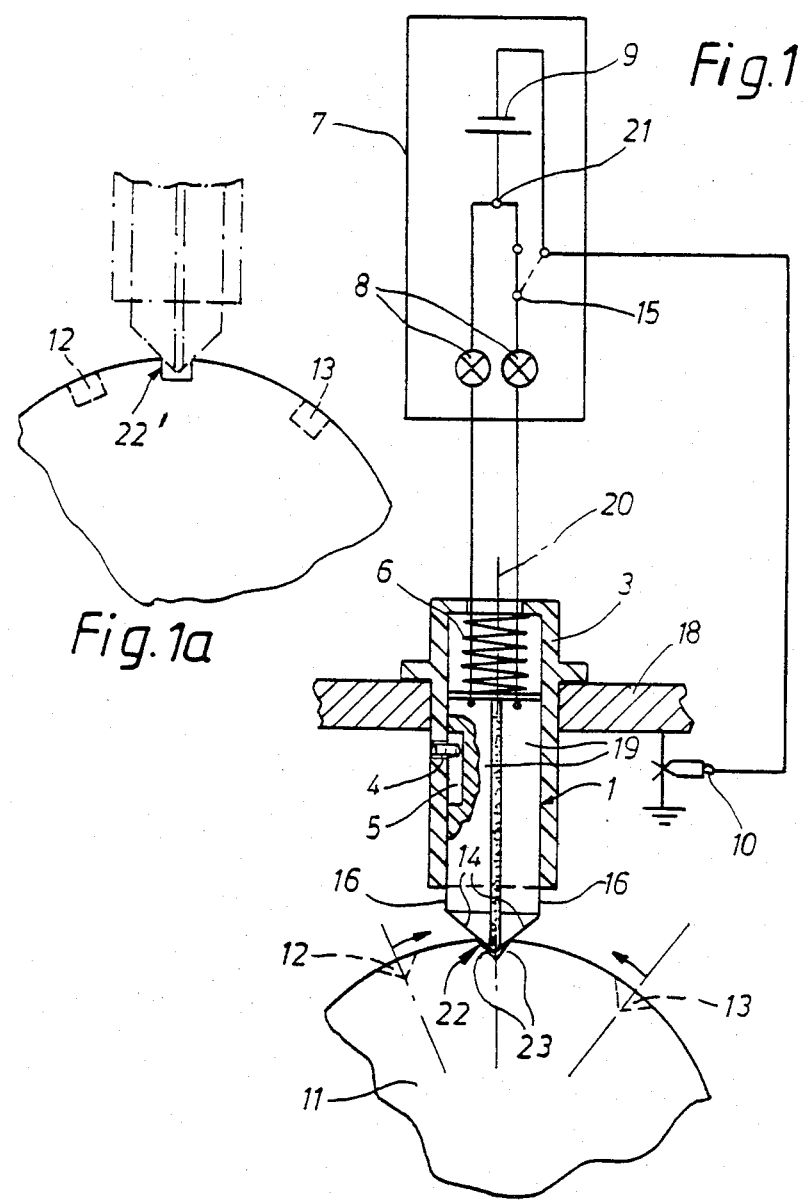
Figure 2:
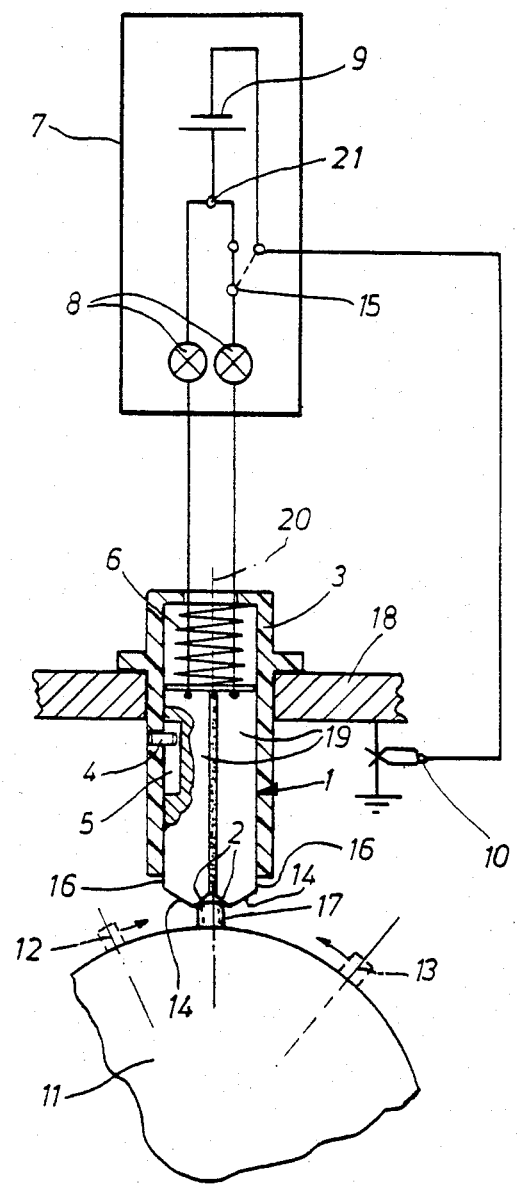
FIG. 2 shows a cross-section through the same arrangement with a marking rod.

An electrically conducting marking, shown as a depression in the form of a notch 22 in FIG. 1 or a groove 22' in FIG. 1a or of a marking rod or protuberance 17 in FIG. 2 of a defined shape in each case is applied at a defined point on the movable part 11 (test object: shaft, disc or slide). At a similarly defined point on the machine casing 18 associated with the moving part 11, the device described below is attached.

A contact rod 1, loaded by means of a compression spring 6 in the direction towards the moving part 11, is supported so that it can slide in a generator housing 3 manufactured from electrically non-conducting material, and it is secured in its axial movement and against rotation by means, for example, of a rod 4 and a groove 5. The contact rod in the illustrative example shown is divided longitudinally and thus consists of two halves, namely the two contact bodies 19 insulated from one another by means of electrically non-conducting adhesives; these contact bodies 19 are aligned with one another and spaced relative in the direction of movement of the depression 22, 22' or indicator rod 17. Depending on the embodiment of the arrangement with marking as depression 22, 22' or indicator rod 17, the following differentiation features apply:

In the illustrative embodiment with depression according to FIG. 1, 1a, the contact surfaces 14 of the contact bodies 19, which surfaces jointly form a V shape, are located symmetrically about the axial central plane 20 of the contact rod 1, which plane is transverse to the direction of movement of the marking. The inclination of these contact surfaces 14 relative to the central plane 20 is greater than the flank inclination of the notch 22, in order to guarantee a good and secure contact.

In the illustrative embodiment with indicator rod according to FIG. 2, the contact surfaces 2 and 14 of the contact bodies 19, which surfaces are each V-shaped, are also located symmetrically about the axial central plane 20 of the contact rod 1, which plane is transverse to the direction of movement of the marking. The peaks or ridge lines of the two contact bodies 19 have a distance between them greater than the diameter of the indicator rod 17, in order to guarantee satisfactory centering of the position sought.

The signal generator housing 3 can be fastened to the machine casing 18 by screwing, insertion or location on fitted bushes, but it must be located in a quite definite peripheral position, namely with the central plane 20 of the generator transverse to the direction of movement of the indicator rod.

A cable leads from each of the contact bodies 19, which are insulated from one another, to the two signalling devices 8 located in the separate signal lamp casing 7, the signalling devices 8 being embodied as signal lamps; from there, the cable continues in each case to the voltage source 9 in the form of a battery, and from there, via a two-way switch 15 to be dealt with later, to the earth or ground connection 10 on the machine casing 18 or the moving part 11 (earth).

If the test object 11 (movable part) in the illustrative embodiments according to FIGS. 1 and 2 now moves from one of the two positions 12 or 13 in the direction of the arrow, it will first contact one of the two outer contact surfaces 14 of the contact bodies 19, whereupon one of the two signal lamps lights up. This is a sign to the operator to move the test object 11 only quite slowly from now on in order, despite the high resolution, to find the position at which both signal lamps light up simultaneously. This is the case in the desired central position, in which the marking in the form of a depression 22, 22' or an indicator rod 17 effects point or line contact with the two contact bodies 19. The electrical circuit is closed simultaneously for both signal lamps only in this position; both signal lamps now light up due to their parallel connection. If, in a tolerance-free embodiment of the arrangement described, this position is passed by only a few minutes of arc, point or line contact then only exists between one of the two contact bodies 19 and the marking, so that one of the two signal lamps is extinguished again, thus indicating to the operator that the desired position has already been passed.

In the case of test objects manufactured from electrically non-conducting material but provided with a marking in electrically conducting material, the connection to earth through the earth connection 10 disappears. By means of the two-way switch 15 on the signal lamp light casing 7, the voltage source 9 and the two signal lamps can be connected in series in this case (dashed switch position). There is then, in contrast to the previous case with parallel connection, no approach indication. With this variant, the electrical circuit to the signal lamps is only closed by accurate positioning of the marking depressions 22, 22' or marking rod 17 between the contact bodies 19. Both signal lamps then light up simultaneously but with decreased brightness.

With regard to the geometry of the contact surfaces 2 and 14 of the contact body ends, it should be noted that the angles of inclination selected are not made too large, in order to avoid jamming of the contact rod 1. Furthermore, the width of the recess between the inner contact surfaces 2 must be greater than the diameter or width of the indicator rod 17. In addition, it is necessary to ensure by means of corresponding dimensioning and adjustment of the signal generator that the indicator rod 17 cannot in any event come into contact with the cylindrical outer sides 16 of the contact rod. In the illustrative embodiment according to FIG. 2, rod 4 and groove 5 act as a stop to limit the axial movement of contact rod 1 to prevent it from contacting the surface of moving part 11 near indicator rod 17. In the illustrative embodiment according to FIG. 1, the peak of the contact rod 1 should be electrically non-conducting, which is attained by means of the insulation material between the two contact bodies 19, so that no electrical contact occurs as yet during the mechanical traversing of the surface of the movable part 11. It should also be noted that the position indication can take place in addition to or instead of the optical indication by means of an acoustic signal.

Although the present invention has been illustrated in detail, it is to be clearly understood that the same is by way of example only and is not to be taken by way of limitation. The spirit and scope of the invention are to be limited only by the claims.

We claim:

1. In an arrangement for the exact adjustment of the position of two parts relative to one another, of which one part, in particular a rotating shaft provided with a mechanical marking, is arranged to be moving and the other part, in particular a casing surrounding the moving part, is arranged to be stationary with, in addition, a signal generator housing located on the stationary part and having a contact rod loaded by spring force in the direction towards the moving part, the contact rod being axially displaceable in the generator housing and having its point which touches the moving part so shaped that the marking can be mechanically traversed from both directions, an indication becoming visible to determine statically the coincidence of the marking with the contact rod, the improvement comprising:

said contact rod being embodied as an electrical contact rod so secured against rotation about its longitudinal axis that it can only be installed in a defined rotational position relative to the signal generator housing;

said marking being a recess formed by a pair of edges in the surface of the moving part;

said contact rod carrying, at least in the area of the protruding end, two contact bodies electrically insulated from one another and from ground, said contact bodies being aligned with one another in the direction of movement of said marking;

said contact surfaces of said contact bodies forming a V shape symmetrically to the axial central plane of the contact rod or of the signal generator housing, which plane being transverse to the direction of movement of the marking, the inclination of said contact surfaces relative to said central plane being greater than the corresponding recess inclination of said marking in the surface of the moving part;

said indication including a voltage source connected to ground on one side and connected in series with a pair of parallel-connected signalling devices, one of each of said signalling devices being connected in series with each of the contact bodies.

2. The arrangement according to claim 1, wherein said signalling devices are signal lamps.

3. The arrangement according to claim 1, including a two-way switch between one of the said signalling devices and said voltage source, the fixed contact of said switch being on the side of the signalling device, and selectively connectable to either said voltage source or ground.

4. The arrangement according to claim 3, wherein said edges of said marking are conductive.

5. The arrangement according to claim 1, wherein said moving part is made of conductive material and is connected to ground.

6. In an arrangement for the exact adjustment of the position of two parts relative to one another, of which one part, in particular a rotating shaft provided with a mechanical marking, is arranged to be moving and the other part, in particular a casing surrounding the moving part, is arranged to be stationary with, in addition, a signal generator housing located on the stationary part and having a contact rod loaded by spring force in the direction towards the moving part, the contact rod being axially displaceable in the generator housing and having its point which touches the moving part so shaped that the marking can be mechanically traversed from both directions, an indication becoming visible to determine statically the coincidence of the marking with the contact rod, the improvement comprising:

said contact rod being embodied as an electrical contact rod and so secured against rotation about its longitudinal axis that it can only be installed in a defined rotational position relative to said signal generator housing;

said contact rod including a stop to limit its axial movement such that it does not contact the surface of the moving part near said marking;

said marking being formed by an indicator rod which protrudes relative to the surface of said moving part;

said contact rod carrying, at least in the area of the protruding end, two contact bodies insulated electrically from one another and from ground and which are aligned with one another in the direction of movement of said indicator rod;

said contact surfaces, each of which is V-shaped, of said contact bodies facing the moving part being located symmetrically to the axial central plane of said contact rod or the signal generator housing, which plane being transverse to the direction of movement of the indicator rod, the peaks or ridge lines of the two contact bodies having a greater distance between them than the diameter of said indicator rod;

said indicator including a voltage source connected to ground on one side and connected in series with a pair of parallel-connected signalling devices, one of each being connected in series with each of the contact bodies.

7. The arrangement according to claim 6, wherein said signalling devices are signal lamps.

8. The arrangement according to claim 6, including a two-way switch between one of said signalling devices and said voltage source, the fixed contact of said switch being on the side of the signalling device, and selectively connectable to either said voltage source or ground.

9. The arrangement according to claim 8, wherein the surface of said indicator rod is conductive.

10. The arrangement according to claim 6, wherein said indicator rod is conductive and connected to ground.

11. In an arrangement for determining when a movable element is at a desired position relative to a stationary element, said movable element having a mechanical marking at said desired position, said stationary element including a contact means biased along an axis transverse to the path of motion of said mechanical marking for contacting said mechanical marking, and indicator means responsive to said contact means for indicating coincidence of said marking and said contact means, the improvements comprising:

said contact means having a pair of electrically conductive contact regions insulated from each other and displaced along the path of motion of said mechanical marking;

said indicator means including a pair of indicators, each one connected to a respective contact region of the contact means and a power source;

said marking having a pair of electrically conductive contact regions;

said contact regions of the contact means and said marking contact regions being shaped so that both indicators are activated only when said marking is at said desired position.

12. The arrangement according to claim 11, where said marking includes a recess having opposing regions and said contact regions of the contact means forming a V shape of greater angle of inclination from said transverse than to said marking contact regions.

13. The arrangement according to claim 11, wherein said marking includes a protuberance extending transverse to said path of motion, and said contact regions of the contact means forming opposing walls of a recess, having a maximum distance of separation greater than the spacing of said marking contact regions.

14. The arrangement according to claim 11, wherein said marking contact regions are both connected to said power source whereby said pair of indicators are connected in parallel to said power source through said contact means and marking contact regions.

15. The arrangement according to claim 11, wherein said marking contact regions are electrically isolated from said power source, and said pair of indicators are connected in series to said power source through said contact means and marking contact regions.

16. The arrangement according to claim 11, including means for preventing said contact means from rotating about said transverse axis.

17. The arrangement according to claim 11, including switch means connected between said power source and said indicator means for selectively connecting said pair of indicators in series or in parallel to said power source.

* * * * *

UNITED STATES PATENT AND TRADEMARK OFFICE
CERTIFICATE OF CORRECTION

PATENT NO. : 4,529,977

DATED : July 16, 1985

INVENTOR(S) : Dieter Kornus & Frank Ruppert

It is certified that error appears in the above-identified patent and that said Letters Patent is hereby corrected as shown below:

Column 6, line 49, after "opposing", insert the word --contact--.

Signed and Sealed this

Twelfth Day of November 1985

[SEAL]

Attest:

Attesting Officer

DONALD J. QUIGG

Commissioner of Patents and Trademarks